(12) United States Patent
Ayoub et al.

(10) Patent No.: US 7,165,621 B2
(45) Date of Patent: Jan. 23, 2007

(54) METHOD FOR EXPLOITATION OF GAS HYDRATES

(75) Inventors: Joseph A. Ayoub, Katy, TX (US);
Stuart I. Jardine, Houston, TX (US);
Terizhandur S. Ramakrishnan, Bethel, CT (US)

(73) Assignee: Schlumberger Technology Corp., Sugar Land, TX (US)

( * ) Notice: Subject to any disclaimer, the term of this patent is extended or adjusted under 35 U.S.C. 154(b) by 232 days.

(21) Appl. No.: 10/915,269

(22) Filed: Aug. 10, 2004

(65) Prior Publication Data

US 2006/0032637 A1  Feb. 16, 2006

(51) Int. Cl.
*E21B 43/00* (2006.01)
*E21B 36/00* (2006.01)

(52) U.S. Cl. .................. 166/369; 166/268; 166/305.1; 166/306; 166/304

(58) Field of Classification Search ............... 166/369, 166/402, 266, 272.1, 272.2, 272.7, 52, 303, 166/268, 305.1, 306, 304
See application file for complete search history.

(56) References Cited

U.S. PATENT DOCUMENTS 4,424,866 A * 1/1984 McGuire ................. 166/303

6,550,542 B2 * 4/2003 Vienot ..................... 166/401
6,978,837 B2 * 12/2005 Yemington ................ 166/303
2006/0060356 A1 * 3/2006 Graue et al. ............ 166/305.1

FOREIGN PATENT DOCUMENTS

| RU | 1574796 | * | 6/1990 |
| RU | 2230899 | * | 6/2004 |
| RU | 2231635 | * | 6/2004 |
| RU | 2250365 | * | 4/2005 |

* cited by examiner

Primary Examiner—Kenneth Thompson
(74) Attorney, Agent, or Firm—Tim Curington; Robin Nara; Dale Gaudier

(57) ABSTRACT

A method and apparatus for producing gas from a hydrate formation includes the use of at least one wellbore which penetrates the hydrate formation and further extends into an aquifer below the hydrate formation. The aquifer provides relatively warm water which may be produced up and into the hydrate formation thereby causing the release of gas from the hydrate. Suitable flow control and monitoring equipment may be included to control the flow of water produced from the aquifer and gas produced from the hydrate formation.

21 Claims, 3 Drawing Sheets

METHOD FOR EXPLOITATION OF GAS HYDRATES

BACKGROUND OF THE INVENTION

1. Field of the Invention

The present invention relates generally to a method of producing gas from gas hydrates. More specifically, the invention is a method for contacting a gas hydrate formation with warmer water from an aquifer to release sequestered gas.

2. Description of the Prior Art

A gas hydrate is a crystalline solid that consists of a gas molecule surrounded by water molecules. The structure is similar to ice, except that the crystalline structure is stabilized by the presence of the gas molecule. The two molecules are dissimilar, but mechanically intermingled, without true chemical bonding. Gas hydrates may be formed of a number of gasses having an appropriate molecular size. These include carbon dioxide, hydrogen sulfide and several low-carbon-number hydrocarbons, including methane. Natural gas hydrates are modified ice structures enclosing methane and possibly other hydrocarbons.

Hydrates tend to form in the pore spaces of sediment layers. However they may also be seen as nodules or deposits of pure hydrate. Gas hydrates are stable at the temperature and pressures typically found on the ocean floor at depths greater than about 500 m. This depth may vary depending on the conditions of a specific location, for instance, hydrates do not tend to form until a depth of approximately 800 m in the eastern United States. Gas hydrates may also be stable in association with permafrost, both on- and off-shore. Natural gas hydrates act as a gas concentrator in that one unit volume of hydrate is equivalent to about 172 unit volumes of methane gas at standard conditions. Often however, the hydrate itself is dilute in the sediment, occupying 2% of the volume on average.

Methane gas trapped in hydrates represent a huge potential source for cleaner energy. One of the key problems in exploiting these hydrate deposits involves finding appropriate methods to produce and collect the gas. This invention describes a production system that creates an appropriate completion to tap heat from an underlying aquifer and efficiently release the gas from the hydrate deposit to produce it to surface. In addition, it is proposed to sequester $CO_2$ in the form of hydrate at the same location following the methane extraction. This process, not only serves to sequester $CO_2$ and help the environment, but could also be used to stabilize the sea bed following methane extraction.

SUMMARY OF THE INVENTION

The present invention is a method of producing the gas trapped in hydrates. The method may include single or multiple production units aimed at releasing and collecting the gas through the use of one or more wellbores. A typical gas collection unit may comprise two basic configurations. The first configuration includes a single well, which provides a water source and a conduit or pathway for producing the gas. In this configuration, the wellbore passes through and is completed in a hydrate zone and also extends into a water-producing zone or aquifer. The second configuration includes two wells. The first well extends into the water bearing zone and provides a water source. The second well is used for production of the gas released from the hydrate and extends into or through the hydrate zone. In either configuration, at least one well is drilled deeper (i.e., extending below the hydrate deposit) and completed in an aquifer or water-producing zone below the hydrate. In certain cases, depending on the specific nature of the aquifer, a fracturing operation may be performed to increase flow from the aquifer. The deeper aquifer water should be sufficiently hot to heat the hydrate, destabilize it, and thereby cause the release of the gas. In order to increase production, a horizontal fracture may be formed or created in the hydrate deposit. Hydrate deposits are typically shallow and the most likely fracture geometry is horizontal. A horizontal fracture may be of particular benefit to facilitate heating the hydrate by providing a larger surface for the warm water to contact the hydrate. Where the well is completed in the lower region of the hydrate deposit, it may be necessary to take adequate precautions to make sure that the hydrate in the higher regions of the deposit do not become destabilized. For instance, monitoring of temperature through the lateral extent of hydrate may be needed. If the temperature exceeds a certain threshold, heating may need to be reduced or curtailed.

Downhole production mechanisms, including valves, pipes and sensors, allow controlled flow of the aquifer water into the hydrate zone through the completion. This completion may include a fracture, particularly a horizontal fracture. The production mechanisms may also allow production of the released gas through a completion (possibly including another horizontal hydraulic fracture) placed higher in the hydrate zone through the same or another vertical or horizontal wellbore. For thick hydrate deposits (i.e., several hundred meters), several layers of completions/horizontal fractures may initially be used in order to efficiently release and collect the gas. For thinner hydrate deposits a single completion/horizontal fracture may be created towards the upper part of the hydrate deposit. The production mechanisms installed may further be used to alternate between the flow of water from the warm aquifer and production of released gas to surface. In certain cases, it may be beneficial to produce the water injected into the hydrate zone along with the released gas and replenish the hydrate zone with fresh warm water from the aquifer. The produced water can be either reinjected into an aquifer or disposed off appropriately.

Any number of sensors may be deployed to track downhole performance via measurements of temperature, pressure and flow rates within the production well or in separate monitoring wells. For instance, temperature may be monitored through side track wells to ensure that the upper portions of the hydrate layer both near and away from the production well do not decompose, in order to prevent methane leakage to the atmosphere. Gas and acoustic detectors may also be used. The input from the sensors can guide the activation of the appropriate downhole valve to control the heating of the sediment by adjusting the water injection. The producing wells are typically tied to a large pipeline that conducts the produced gas towards a compressor station and onward for further processing/distribution. For hydrate formed in sediments, the fractures could enhance significantly the production process. Since constant heating of the hydrate layer may be needed the water injected into the hydrate may have to be produced periodically, and replenished with fresh warm water from the aquifer below.

In addition, the gas hydrate wells may be used to sequester $CO_2$ as hydrate by injecting the $CO_2$ down the well and into the previously depleted methane hydrate zone. $CO_2$ and methane hydrates can form under similar pressure/temperature and water conditions. The downhole temperature and pressure needed for $CO_2$ hydrate formation are typically evaluated to ensure that $CO_2$ hydrate formation is possible. If so, the installed production mechanisms may be used to inject the $CO_2$, which is typically in a liquid form, into the formation where it mixes with in situ water and forms hydrate.

The $CO_2$ sequestration process described above would not only address a very contemporary environmental concern, but could also serve to stabilize/reinforce the downhole structure. It is well known that some hydrate deposits under the sea floor carry a high risk of causing destabilization of the sea floor. The proposed $CO_2$ sequestration process provides a solution by replacing the methane hydrate and reinforcing the existing structure. Acoustic detectors could be used to help predict any impending formation instabilities and decide when to initiate the switch from methane production to $CO_2$ sequestration.

DETAILED DESCRIPTION OF THE PREFERRED EMBODIMENTS

The present invention is a method for producing gas from gas hydrate formations using relatively warmer water from an aquifer or other water-producing formation or zone below the hydrate formation.

Figure 1:
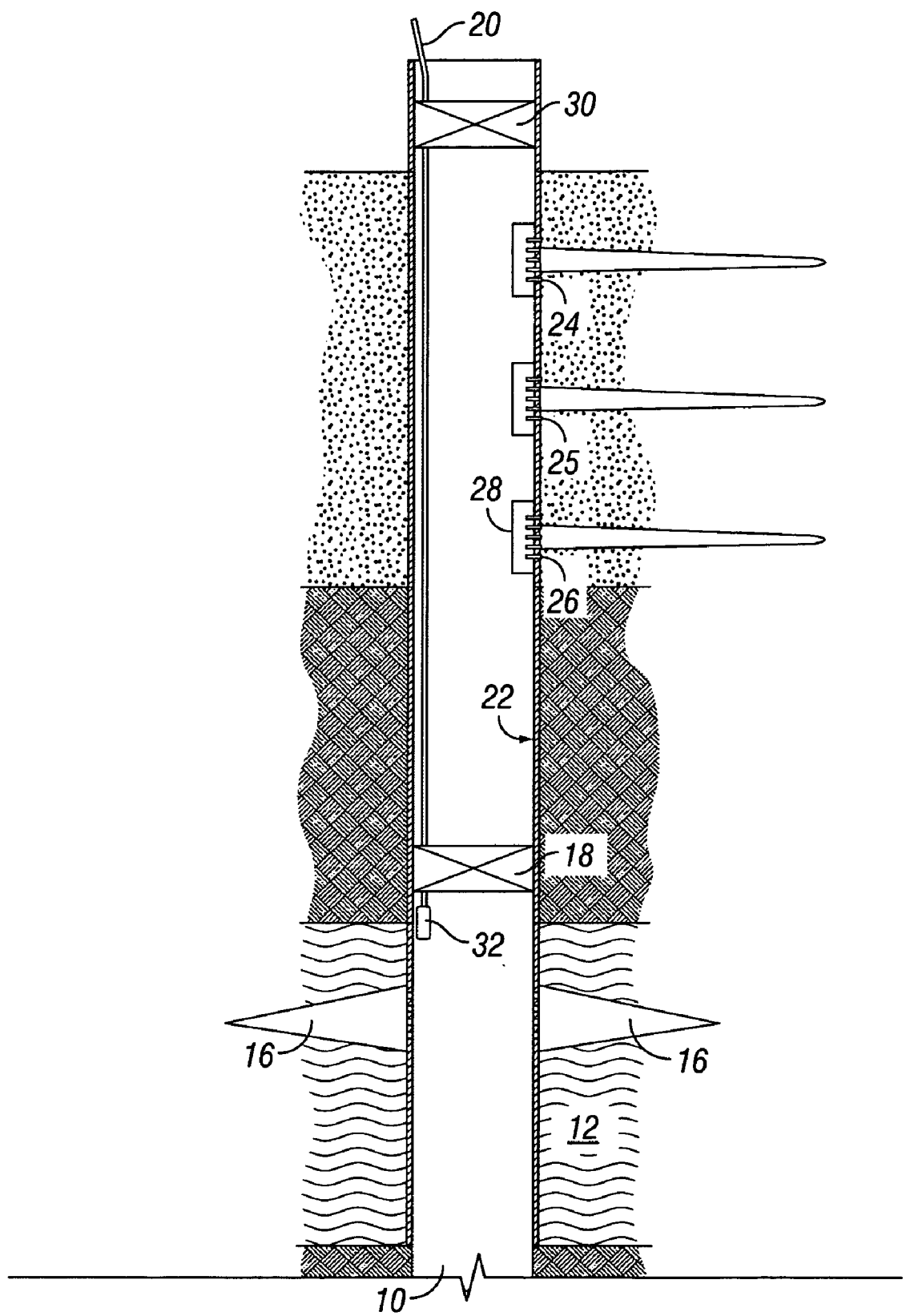
FIG. 1 is a diagram of a single wellbore embodiment of the present invention.

FIG. 1 shows a first embodiment of the invention, wherein a single cased wellbore 10 is used to produce water from an aquifer 12 or other water-producing formation or zone and to produce gas generated from a gas hydrate formation 14. The wellbore extends through the gas hydrate formation and into the aquifer. Said aquifer is preferably located or positioned substantially below (i.e., deeper) than the hydrate formation. Depending on the specific features of the aquifer, it may be desirable to perform a stimulation operation to increase water output. This may involve hydraulic fracturing, acidizing or the like. Similarly, it may also be desirable to fracture the hydrate deposit prior to treatment with water from the aquifer. Where necessary, the aquifer water may be suitable pressurized using a suitable pumping device.

Once the wellbore is completed in the aquifer, water may be produced up into the gas hydrate formation. The influx of relatively warmer water from the aquifer results in a release of the gas trapped or sequestered in the hydrate. The injected water may cool relatively rapidly, and therefore it is preferable to produce the injected water and reinject fresh hot water. The produced water may have methane liberated in or with the water. This comingled water and gas may be separated either in situ or on the surface. The separated water may be reinjected into the hydrate layer, the aquifer or an alternate storage location, such as an alternate aquifer. Any suitable arrangement of valves 18 or other wellbore flow control equipment or devices may be used to control the flow of water from the aquifer 12 into the hydrate formation 14. Flapper valves, ball valves and formation isolation valves (such as those described in U.S. Pat. Nos. 6,352,119 and 6,691,785, both which are incorporated herein by reference) are preferred. In a particularly preferred embodiment, the valve system 18 is selectively controlled from the surface by a suitable control system. This control system may include an electrical or hydraulic communication system such as wires or lines 20 extending from the surface to the valves. The control system may also include any suitable wireless technology.

In addition to providing a mechanism for selectively controlling the flow of water from the aquifer, it may also be desirable to provide a fail-safe mechanism for preventing the flow of water and/or gas through the wellbore to the surface, or flow of sea water into the wellbore in case of accidental failure of well surface equipment. Such mechanism may be any suitable device; however, a valve-based system 30 is preferred. More particularly, flapper valves, ball valves and formation isolation valves are preferred. In an alternative embodiment, the BOPs may be used to prevent flow or production of wellbore fluids to the surface.

As shown in FIG. 1, the casing 22 must be perforated in order to establish fluid communication between the wellbore and the hydrate formation. Depending on the size of hydrate formation, it may be useful or desirable to place or locate perforations in multiple locations in the formation 24, 25, 26. Once the perforations are formed in the casing, the hydrate formation may also be fractured or otherwise treated. In order to selectively choose the locations and timing of water injection and the location and timing of gas production an internal isolation mechanism 28 may be included to seal or obstruct the perforations. In a preferred embodiment, a sliding sleeve mechanism may be used to selectively open or isolate the perforations. In an alternative embodiment, a chemical isolation mechanism may be used to seal the perforations. Such chemical isolation mechanism may include a cement or polymer based material or any other material suitable for substantially preventing or limiting the flow of fluids into or out of the perforations.

A sensor package including but not limited to, temperature sensors (e.g., Schlumberger's Distributed Temperature System (DTS) as described in U.S. Pat. No. 5,286,109 which is incorporated herein by reference), pressure sensors, gas detectors and acoustic sensors (e.g., geophones) may be deployed to monitor the water flood process and trigger the activation of any of the downhole control valves and equipment required to adequately control the treatment of the hydrate formation. For example, shutting off or reducing the water injection into the hydrate and opening a sliding sleeve or other valve to start gas production. A separate well could also be used to monitor temperature or passive seismic events away from the producing well to better control the production process and avoid destabilizing the hydrate zone.

Figure 2:
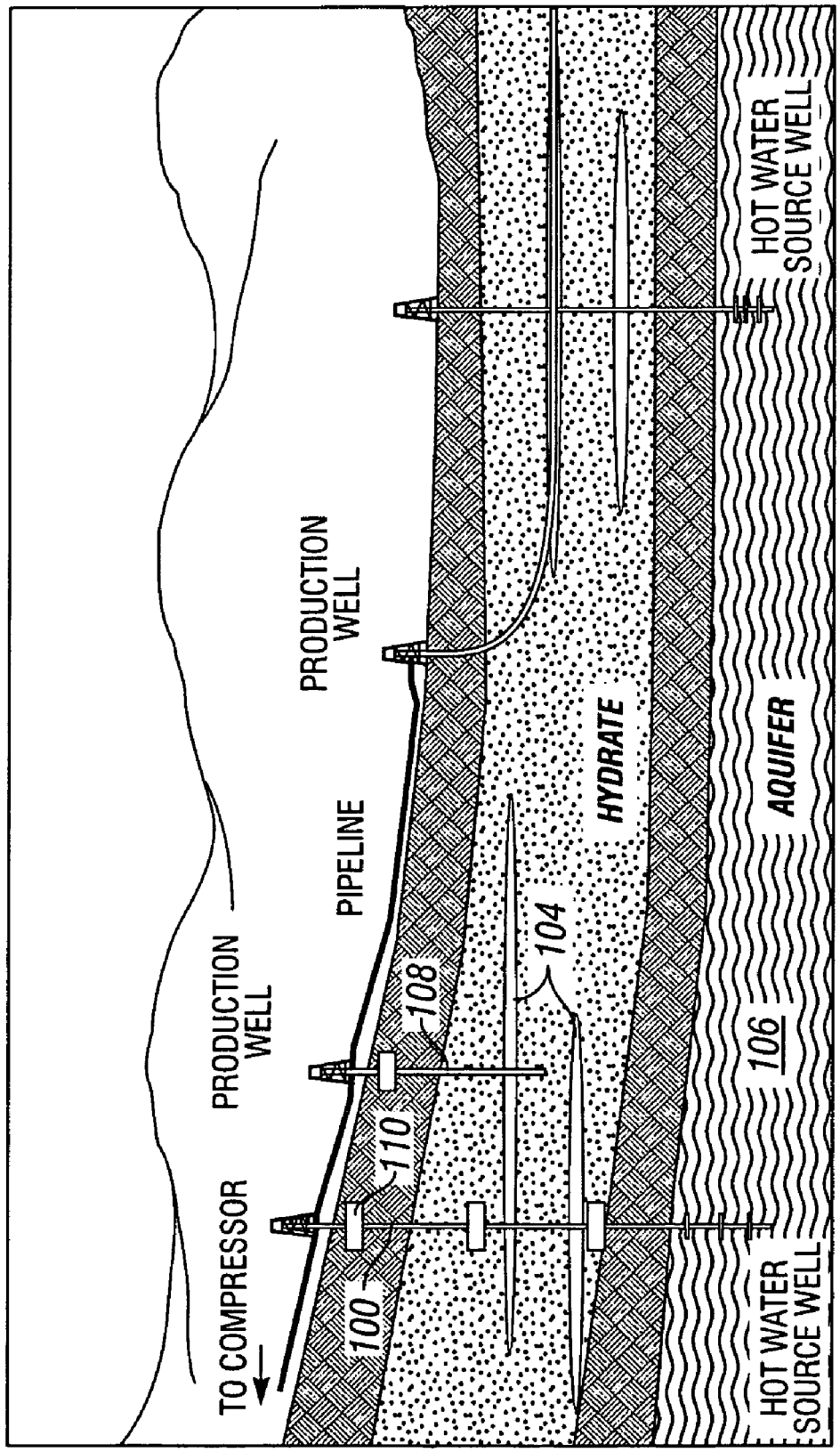
FIG. 2 is a diagram of a multiple wellbore embodiment of the present invention.

In another embodiment of the present invention, and as shown in FIG. 2, a first wellbore 100 is provided which extends from the surface 102 through a gas hydrate formation 104 and into an aquifer or water-bearing formation or zone 106. A second wellbore 108 extends from the surface 102 and into the gas hydrate formation 104. The first wellbore provides fluid communication between the aquifer and the gas hydrate, allowing water produced from the aquifer to contact the gas hydrate. Preferably, the first wellbore is sealed or isolated from the surface (above the level of the hydrate formation) to prevent either water or gas from being conducted or produced to the surface. Alternatively, water and/or gas may be produced from the first wellbore, followed by water injection into the hydrate zone, until communication is established with the second wellbore. Once such communication is established, the first wellbore may then be isolated from the surface. Preferably, a valve system 110 is used to provide isolation of the aquifer, if needed. Valves useful in the present invention, include but are not limited to, flapper valves, ball valves and formation isolation valves. In a preferred embodiment, a suitable arrangement of flow control mechanisms (such as valves or flappers) may be used to provide water to the hydrate formation, produce and separate the gas and then reinject the water into an aquifer. This embodiment is particularly useful where continued melting of the hydrate does not occur.

As water from the aquifer contacts the hydrate, gas is released. This released gas, along with water, may be produced or conducted to the surface through the second wellbore. The second wellbore may include any number of suitable flow control and measurement mechanisms. Preferably, the second wellbore will include at least one valve apparatus or system 112 for controlling the flow of produced fluids from the formation to the surface.

Figure 3:
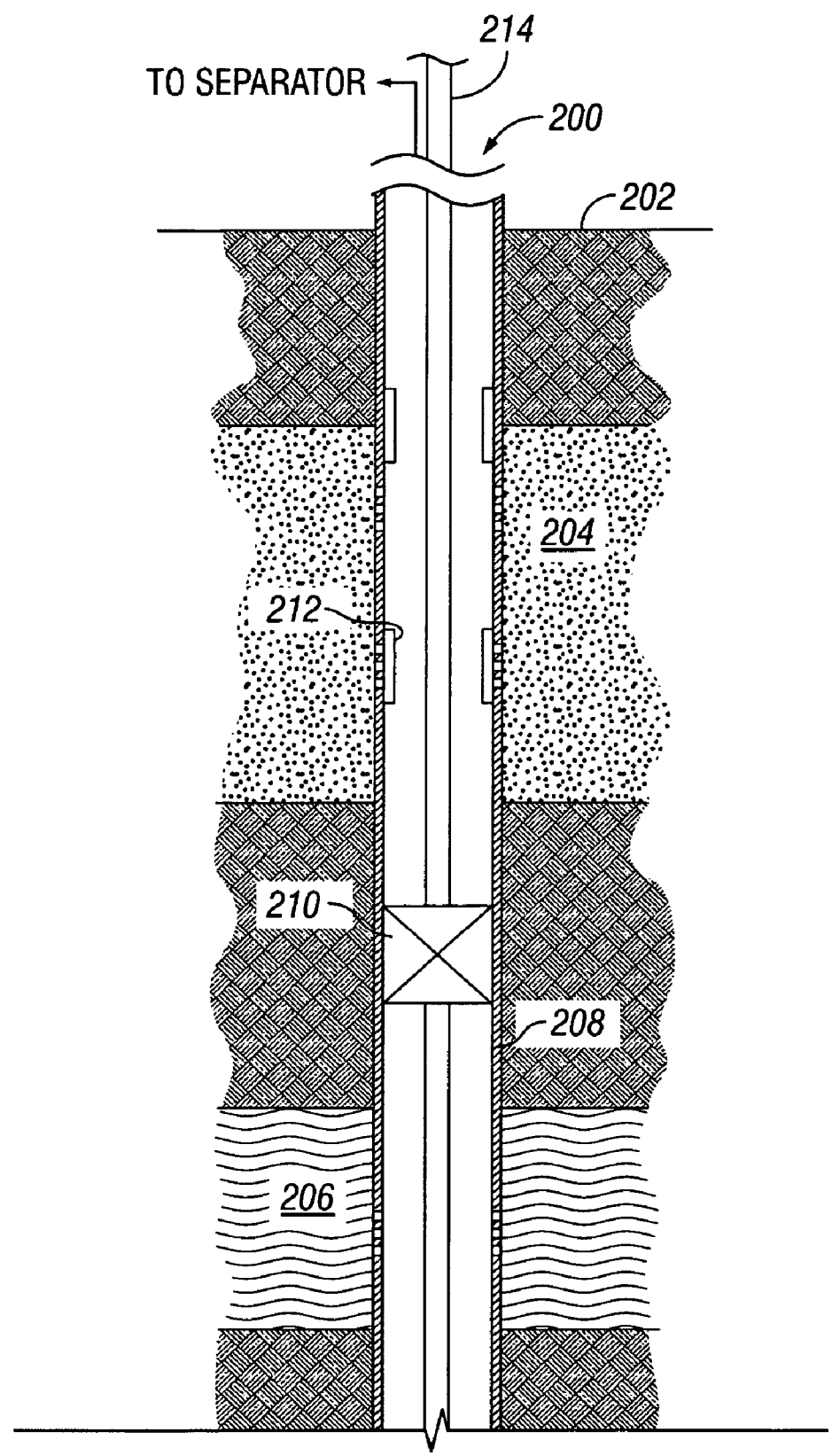
FIG. 3 is a diagram showing a wellbore configuration for reinjecting produced water.

In yet another embodiment of the present invention, and as shown in FIG. 3, a wellbore 200 may be provided which extends from the surface 202 through a hydrate formation or deposit 204 and into an aquifer or other water bearing formation 206. The wellbore contains or has disposed therein a conduit 208 extending from the surface to the aquifer. The conduit may be any suitable material, including drill string, casing or coiled tubing. A first flow control mechanism 210 is positioned below the hydrate formation and above the aquifer to control the flow of water from the aquifer to the formation. This mechanism may include any suitable device or material, but is preferably a valve. More preferably the valve can be controlled from the surface by an operator. A second flow control mechanism 212 is positioned substantially adjacent to the region or zone within the hydrate formation that is to be treated or contacted with water from the aquifer. In a preferred embodiment, the second flow control mechanism is a sliding sleeve; however, it should be understood that any suitable device may be used. The sliding sleeve may be selectively opened and closed by the operator. Depending on the specific nature of the hydrate formation and the treatment parameters, any number of flow control mechanisms may be positioned within the hydrate formation, each corresponding generally to a region or zone to be treated.

As the first valve 210 is opened and water from the aquifer flows upward, the sliding sleeve 212 may be opened to allow the water to contact the hydrate. As gas is produced it flows upward to the surface, along with water from the aquifer. At the surface, the water and gas may be separated. In certain cases, it may be desireable to reinject the separated water back into the aquifer used for production or another aquifer using a separate well or the same wellbore. In such a case, the sliding sleeve(s) may be moved to a closed position to prevent the separated water from entering the hydrate formation as it is reinjected down or through the conduit. Alternatively, a second conduit 214 may be provided to allow the water to be reinjected into the aquifer. In this way, water and gas are produced to the surface through the first conduit and water is reinjected through the second. Therefore, production does not have to be interrupted to reinject the separated water. Where a plurality of zones are being treated in the hydrate formation, it may be desireable to selectively treat a lower zone, followed by an upper zone. The operator controlled flow control device(s) 212 allow selective treatment of specific zones.

As hydrate is converted to gas, the area around the hydrate deposit, as well as the deposit itself, may be destabilized. Where the risk of destabilization is present, it may be desirable to design or arrange wellbore(s) to minimize this risk. For instance, pockets in the hydrate deposit may be selectively produced such that the produced pockets are spaced far enough from each other such that the hydrate deposit remain stable. Alternatively, a network or wellbores and/or pipelines may be put in place to reduce or minimize the subsidence effects of hydrate production or removal. To prevent complete destabilization, temperature monitoring wells may be created on the upper portion of the hydrate deposit. As the temperature changes, water flow may be adjusted to produce controlled heating of the hydrate layer.

In another embodiment of the present invention, $CO_2$ may be injected or otherwise placed into the hydrate formation to effectively replace the methane which is produced. In this way, the $CO_2$ may be stored or otherwise disposed of and may also serve to stabilize the hydrate formation following removal of the methane. Preferably, the $CO_2$ is provided in a liquid form, mixed with water and injected into the hydrate layer. More preferably, the $CO_2$ is provided in supercritical form.

The $CO_2$ may be placed using the same wellbore(s) used to produce methane from the hydrate formation. Alternatively, additional wellbores may be provided, depending on the specific nature of operation being conducted. For instance, in one embodiment, methane may be produced from a first wellbore. Upon completion of the methane production operation, $CO_2$ may be injected down the same wellbore. In another embodiment, a first wellbore may initially be used to produce water from the aquifer into the hydrate formation. A second wellbore may be used to produce the methane to the surface. This first wellbore may be used to place $CO_2$ into the hydrate formation once a sufficient quantity of water has been provided to the formation.

In an alternative embodiment, the $CO_2$ may be provided or placed into the hydrate formation through coiled tubing. The tubing may be run into the wellbore and positioned substantially adjacent to the hydrate formation. Suitable wellbore isolation mechanisms, such as packers, may be used to prevent the $CO_2$ from migrating out of or away from the hydrate formation. The $CO_2$ may also be mixed with the water and injected.

These specific embodiments should not limit the scope of the present invention, as any suitable configuration of equipment may be used.

We claim:

1. A method for recovering gas from a subterranean formation having a gas hydrate deposit located therein and wherein said formation further includes a liquid source, comprising the steps of:
   (a) providing a wellbore penetrating said gas hydrate deposit and extending into said liquid source; and
   (b) producing liquid from said liquid source into said gas hydrate deposit; and
   (c) contacting said gas hydrate deposit with liquid from said liquid source to produce gas.

2. The method of claim 1, wherein said wellbore is cased.

3. The method of claim 1, further comprising providing at least one sensor.

4. The method of claim 1, wherein said liquid is separated from said gas and reinjected into said liquid source.

5. The method of claim 1, wherein said liquid is separated from said gas and reinjected into a subterranean formation.

6. The method of claim 1, further comprising the step of recovering said gas.

7. The method of claim 6, further comprising the step of placing a second fluid into the hydrate formation, wherein said second fluid is capable of forming a hydrate.

8. The method of claim 7, wherein said second fluid is $CO_2$.

9. The method of claim 1, further comprising the step of perforating the casing.

10. The method of claim 9, wherein perforations are placed in the casing substantially adjacent to said liquid source.

11. The method of claim 9, wherein perforations are placed in the casing substantially adjacent to said hydrate deposit.

12. The method of claim 11, further comprising the step of providing a mechanism for selectively isolating said perforations.

13. The method of claim 12, wherein said mechanism is a sliding sleeve.

14. The method of claim 1, further comprising the step of monitoring the temperature of said hydrate deposit.

15. The method of claim 1, further comprising the step of monitoring passive seismic activity using acoustic sensors.

16. The method of either of claims 14 or 15, wherein the rate at which liquid from the liquid source is produced into said hydrate formation is dependent on input from said monitoring.

17. The method of either of claims 14 or 15, wherein said monitoring is conducted from a separate wellbore.

18. A method for recovering gas from a subterranean formation having a gas hydrate deposit located therein and wherein said formation further includes a liquid source, comprising the steps of:
   (a) providing a wellbore penetrating said gas hydrate deposit and extending into said liquid source; and
   (b) producing liquid from said liquid source into said gas hydrate deposit; and
   (c) providing a wellbore isolation mechanism positioned below said hydrate deposit.

19. The method of claim 18, wherein said isolation mechanism is a valve.

20. A method for recovering gas from a subterranean formation having a gas hydrate deposit located therein and wherein said formation further includes a liquid source, comprising the steps of:
   (a) providing a wellbore penetrating said gas hydrate deposit and extending into said liquid source; and
   (b) producing liquid from said liquid source into said gas hydrate deposit; and
   (c) providing a wellbore isolation mechanism positioned above said hydrate deposit.

21. The method of claim 20, wherein said isolation mechanism is a valve.

* * * * *